July 23, 1968  D. C. HARER ETAL  3,393,499
CONDITIONER DRIVE LUBRICATING SYSTEM
Filed Oct. 24, 1965

INVENTORS
DELMAR C. HARER &
BURNELL E. NELSEN
BY Donald D. Schaper
ATTORNEY

United States Patent Office 3,393,499
Patented July 23, 1968

3,393,499
CONDITIONER DRIVE LUBRICATING SYSTEM
Delmar C. Harer and Burnell E. Nelsen, New Holland, Pa., assignors to Sperry Rand Corporation, New Holland, Pa., a corporation of Delaware
Filed Oct. 24, 1965, Ser. No. 504,925
5 Claims. (Cl. 56—1)

ABSTRACT OF THE DISCLOSURE

This invention provides an automatic oiler for drive chains used in drive systems for various harvesting headers on agricultural harvesting machines including hay conditioners. It further provides automatic periodic metering of oil from a reservoir formed in one of the header lift arms during use. Due to strategic location of outlet the fitting and disposition of outlet tubes, provision is made also for automatic shut off when the machine is not operating, as when the header is in a raised non-operative condition.

---

This invention relates to agricultural machines which are adapted to cut standing crop material, consolidate it, and deposit the material in a windrow. More specifically the invention relates to a lubricating system for use in such a machine.

A windrower or swather, of the type to which this invention is particularly applicable, comprises a frame supported on wheels for field travel, and a header carried on the forward end of the frame for cutting standing crop material and for consolidating the cut material at a center location. A conditioner may be mounted directly behind the header, when it is desired to condition the crop material before it leaves the machine and is finally deposited on the ground. Conditioning of the crop material is accomplished by passing the material between a pair of cooperative crusher or crimper rolls as the material comes from the header consolidating means. The conditioning action facilitates drying of the severed crop material so that less drying time is required before the material can be baled or otherwise handled.

The conditioner when in position directly behind the header is normally located between the machine wheels, and on self-propelled machines, it is common to have the operator's platform over at least a portion of the conditioner. Thus, the conditioner is substantially enclosed by machine components which creates a problem in getting lubrication to the conditioner roll drive chains. Because of the difficulty of obtaining access to the drive chains, the farmer tends to neglect lubrication of the chains. If the roll drive chains are allowed to run without periodic lubrication, rapid joint wear will in a short time cause the chains to elongate to a point where they will no longer operate properly over the sprocket teeth.

Accordingly, one object of this invention is to provide an improved and simplified means for lubricating an agricultural machine drive means.

Another object of this invention is to provide an automatic lubricating system in a machine of the character described.

A further object of this invention is to provide a lubricating system in a machine of the character described which is compact and is incorporated in the conditioner lifting means.

Other objects of this invention will be apparent hereinafter from the specification and from the recital in the appended claims.

Figure 1:
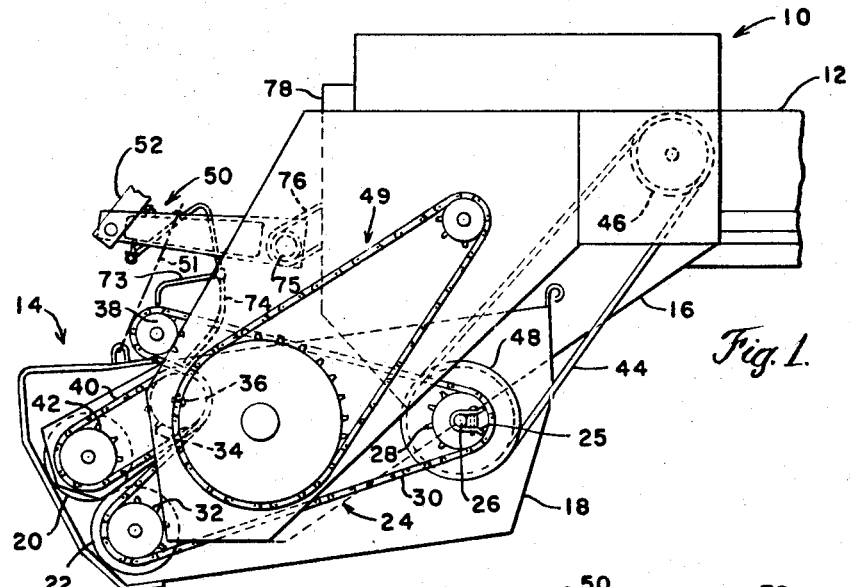
Figure 2:
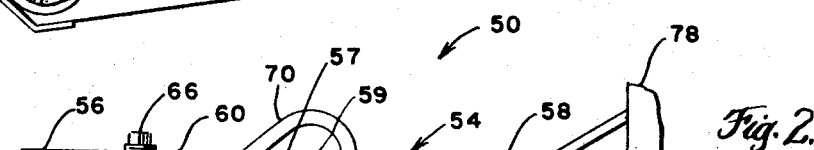
Figure 3:
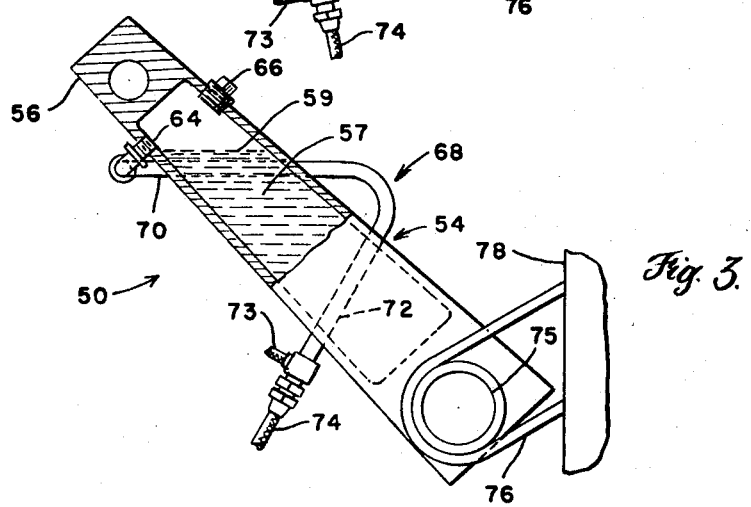

In the drawings:
FIG. 1 is a general view of the center section of a windrower with the conditioner attached thereto and showing the conditioner roll drive means;

FIG. 2 is an enlarged view of the conditioner lifting means support arm with the lubricant reservoir in the interior thereof and showing the lubricant level when the support arm is in the "down" position; and FIG. 3 is a view similar to FIG. 2 of the support arm, but with the support arm in the "up" position and showing the change in position of the lubricant level.

Referring now to the drawings by numerals of reference, and particularly to FIG. 1, 10 denotes a windrower center section having a frame 12 which is adapted to be supported on ground wheels, not shown, for travel through a field. A crop conditioner 14 is mounted between a pair of frame side channels 16, one of which is shown.

Crop conditioner 14 comprises a frame structure 18, a pair of cooperative conditioning rolls 20, 22 supported on structure 18, and roll drive means 24. Conditioner 14 is pivotally mounted in a pair of saddle brackets 25 on frame side channels 16 (only one bracket being shown) so that it may be raised and lowered with the machine header, not shown, located forwardly of the conditioner.

Drive means 24 comprises: a drive shaft 26 rotatably mounted in frame structure 18, a sprocket 28 fixed to shaft 26, a driven sprocket 32 on roll 22, a driven sprocket 34 on shaft 36 journalled in frame structure 18, an adjustable idler sprocket 38, and a first endless drive chain 30 driven by sprocket 28 and in turn driving sprockets 32, 34 and 38; and a second endless drive chain 40 which receives power from shaft 36 to drive sprocket 42 on conditioner roll 20. Power is supplied to drive means 24 by an endless belt 44 which extends around engine drive pulley 46 and sheave 48 on shaft 26. A chain means 49 is adapted to drive the windrower ground wheels, not shown.

A means for raising and lowering conditioner 18, and a header (not shown) located forwardly of the conditioner, is provided which comprises a pair of axially aligned support arms, the left arm 50 only being shown, which are linked to the conditioner forward end by any conventional link means, such as shown in FIGS. 1 and 5, parts 80–84, in assignee's U.S. Patent No. 3,262,253 issued July 26, 1966 the linkage being indicated diagrammatically for arm 50 by the dot-and-dash line 51 in FIG. 1. Support arm 50 is adapted to be lifted hydraulically through an element 52. Support arm 50 has a tubular section 54 preferably of rectangular cross-section between a radially outward end 56 and an inner end 58 adjacent its pivotal mounting, a top wall 60, and a bottom wall 62. Support arm 50 is fixed to a rockshaft 75 and oscillates in brackets 76. Brackets 76 extend from a frame cross member 78 and are fixed thereto by welding or other means.

The lubricating system of this invention comprises a reservoir for a lubricant 57 in tubular section 54 of support arm 50. An outlet 64 for the reservoir is formed in bottom wall 62 of section 54 and a filler plug 66 is threaded into top wall 60. A fluid conduit 68 is threaded into outlet 64 and has a first generally vertical portion 70 which extends above the support arm top wall 60 and a second portion 72 which extends toward drive means 24 and terminates in spouts 73 and 74 which are positioned respectively over drive chains 30 and 40.

In operation, with conditioner 18 in position to receive crop material from the header, support arm 50 is in a "down" generally horizontal position, as shown in FIGS. 1 and 2. With the support arm in the "down" position, lubricant will rise in conduit section 70 to the same height as the lubricant level 59 in the reservoir to provide a quantity, or charge, of fluid in section 70. It will be seen that no lubricant flows to the drive chains with the support arm in the "down" position. When the conditioner is raised, support arm 50 moves to its "up" position, as shown in FIG. 3. With the support arm 50 in an "up" position, the quantity of lubricant in conduit section 70 will flow through section 72 to discharge spouts 73 and 74 and onto the drive chains 30 and 40. Outlet 64 is above the level 59 of the lubricant when arm 50 is in the "up" position so that only the quantity of lubricant trapped in section 70 will be discharged each time the arm is raised. It is normal to raise the header and conditioner at each end of the field in most field operations. Thus, it will be seen that the drive chains are lubricated automatically at each end of the field, and the service life of the chains is materially increased. Further, lubricant flow is automatically stopped when the conditioner and header are in a raised transport position. When the components are again placed in operation, the lubricating system will operate automatically as described above.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In an agricultural machine, a frame extending in a fore-and-aft direction relative to ground travel, a crop conditioner pivotally mounted on said frame, and having a forward end, a pair of cooperative rolls rotatably carried on said conditioner forward end and extending transversely to said frame, drive means for rotating said rolls and located adjacent one of their axial ends, said drive means comprising first and second drive chains, a cross member on said frame located above a mid portion of said conditioner and extending generally parallel to said rolls, a support arm for carrying the conditioner forward end and pivotally mounted to said cross member, said support arm being pivotal through an arc in a vertical plane from a down position when said conditioner is in an operative position to an up position when said conditioner is in an inoperative position, said support arm having a radially outward forward end and an opposite end adjacent said cross member, said support arm having a reservoir therein for containing a lubricant, said reservoir having an outlet adjacent said support arm forward end, said outlet being below the level of lubricant when said support arm is in a down position and above the level of lubricant when said arm is in an up position, a conduit extending from said outlet and having a first portion which fills with a quantity of lubricant when said support arm is in a down position and a second portion in fluid communication with said first portion which receives said quantity of lubricant when said support arm is in its up position, said conduit second portion having a first discharge spout over said first drive chain and a second discharge spout over said second drive chain whereby each time said conditioner is raised to an inoperative position said quantity of lubricant is discharged through said spouts onto said first and second drive chains.

2. In an agricultural machine, as recited in claim 1, wherein said support arm has a tubular section between its ends and said tubular section is substantially rectangular in cross section, said reservoir is in said tubular section, said tubular section is formed with a pair of spaced apart vertical sides and a top side and a bottom side, said outlet is in said bottom side, said fluid conduit first portion extends from said outlet to a point above said top side, and said conduit second portion extends from said point to drive chains.

3. In an agricultural machine, a frame extending in a fore-and-aft direction relative to ground travel, rotatable crop engaging means carried on said frame, said crop engaging means extending transversely to said frame, drive means operatively connected to one axial end of said crop engaging means, said drive means comprising a drive chain, link means for raising and lowering said crop engaging means, said link means comprising a support arm pivotally mounted to said frame, said support arm being generally horizontally disposed and pivotal through an arc in a vertical plane from a down position when said crop engaging means is in an operative position to an up position when said crop enaging means is in an inoperative position, said support arm having a radially outward end and an opposite end adjacent its pivotal connection, said support arm having a reservoir therein for containing a lubricant, said reservoir having an outlet adjacent said support arm outward end, said outlet being below the level of lubricant when said support arm is in a down position and above the level of lubricant when said arm is in its up position, a conduit extending from said outlet and having a first portion which fills with a quantity of lubricant when said support arm is in a down position and a second portion in fluid communication with said first portion which receives said quantity of lubricant when said support arm is in its up position, said conduit second portion having a discharge spout over said drive chain whereby each time said crop engaging means is raised to an inoperative position said quantity of lubricant is discharged through said spout onto said drive chain.

4. In an agricultural machine, a frame extending in a fore-and-aft direction relative to ground travel, a crop conditioner pivotally mounted on said frame and having a forward end, a pair of cooperative rolls rotatably carried on said conditioner forward end and extending transversely to said frame, drive means for rotating said rolls and located adjacent one of their axial ends, said drive means comprising a drive chain, a support arm pivotally mounted on said frame for carrying a said conditioner forward end and adapted to be raised and lowered to move said conditioner from an operative down position to an inoperative up position, and means for lubricating said drive chain in response to movements of said support arm in raising and lowering said conditioner.

5. In an agricultural machine, as recited in claim 4, wherein said means comprises a lubricant reservoir and a conduit which extends from said reservoir to said drive chain.

References Cited

UNITED STATES PATENTS

| 2,316,996 | 4/1943 | Smith | 184—15 X |
| 2,989,829 | 6/1961 | Heth et al. | 56—1 |
| 3,053,371 | 9/1962 | Fischer | 184—15 X |
| 3,262,253 | 7/1966 | Halls | 56—1 |

FOREIGN PATENTS

| 485,668 | 10/1953 | Italy. | |

LUCIE H. LAUDENSLAGER, *Primary Examiner.*